US005581128A

United States Patent [19]
Royle

[11] Patent Number: 5,581,128
[45] Date of Patent: Dec. 3, 1996

[54] GAS-TURBINE AND STEAM-TURBINE BASED ELECTRIC POWER GENERATION SYSTEM WITH AN ADDITIONAL AUXILIARY STEAM TURBINE TO COMPENSATE LOAD FLUCTUATIONS

[75] Inventor: Eric E. Royle, Leicestershire, United Kingdom

[73] Assignee: European Gas Turbines Limited, United Kingdom

[21] Appl. No.: 184,224

[22] Filed: Jan. 19, 1994

[30] Foreign Application Priority Data

Feb. 3, 1993 [GB] United Kingdom ............ 9302081

[51] Int. Cl.⁶ .................... F01D 15/10; F02C 6/00; F02B 45/02; F01K 23/00
[52] U.S. Cl. .................. 290/4 D; 290/52; 60/39.12; 60/39; 60/82
[58] Field of Search ................ 60/39.12, 39.182, 60/643–670; 290/4 D, 52, 4 A, 54

[56] References Cited

U.S. PATENT DOCUMENTS

| | | | |
|---|---|---|---|
| 3,374,621 | 3/1968 | Pacault et al. | 60/39.18 |
| 3,986,348 | 10/1976 | Switzer, Jr. | 60/39.02 |
| 4,132,065 | 1/1979 | McGann | 60/39.02 |
| 4,282,708 | 8/1981 | Kuribayashi et al. | 60/39.02 |
| 4,631,915 | 12/1986 | Frewer et al. | 60/39.12 |
| 4,896,498 | 1/1990 | Knizia | 60/39.03 |
| 4,996,836 | 3/1991 | Reh et al. | 60/39.02 |

FOREIGN PATENT DOCUMENTS

| | | | |
|---|---|---|---|
| 3542518A1 | 6/1988 | Germany | F01K 23/10 |
| 668290A5 | 12/1988 | Germany | F01K 23/06 |
| 1493604 | 11/1977 | United Kingdom . | |
| 2253407 | 9/1992 | United Kingdom . | |

Primary Examiner—Steven L. Stephan
Assistant Examiner—Christopher Cuneo
Attorney, Agent, or Firm—Kirschstein, et al.

[57] ABSTRACT

An electric power generating system employing a gas turbine (1) and a steam turbine (5) and a gasifier (9) supplying fuel-gas to the gas turbine (1) and to a steam generating fluidized bed combustor (37), the latter providing steam for the steam turbine (5). An auxiliary steam turbine (21), driving an electric generator (22), is also supplied by the circulating fluidized bed combustor steam generator (37). Since the gasifier (9) cannot be reversibly turned down easily, on a fall in load on the main steam turbine (5), the excess steam generated is diverted to the auxiliary steam generator (21) and the gasifier (9) kept running efficiently.

11 Claims, 1 Drawing Sheet

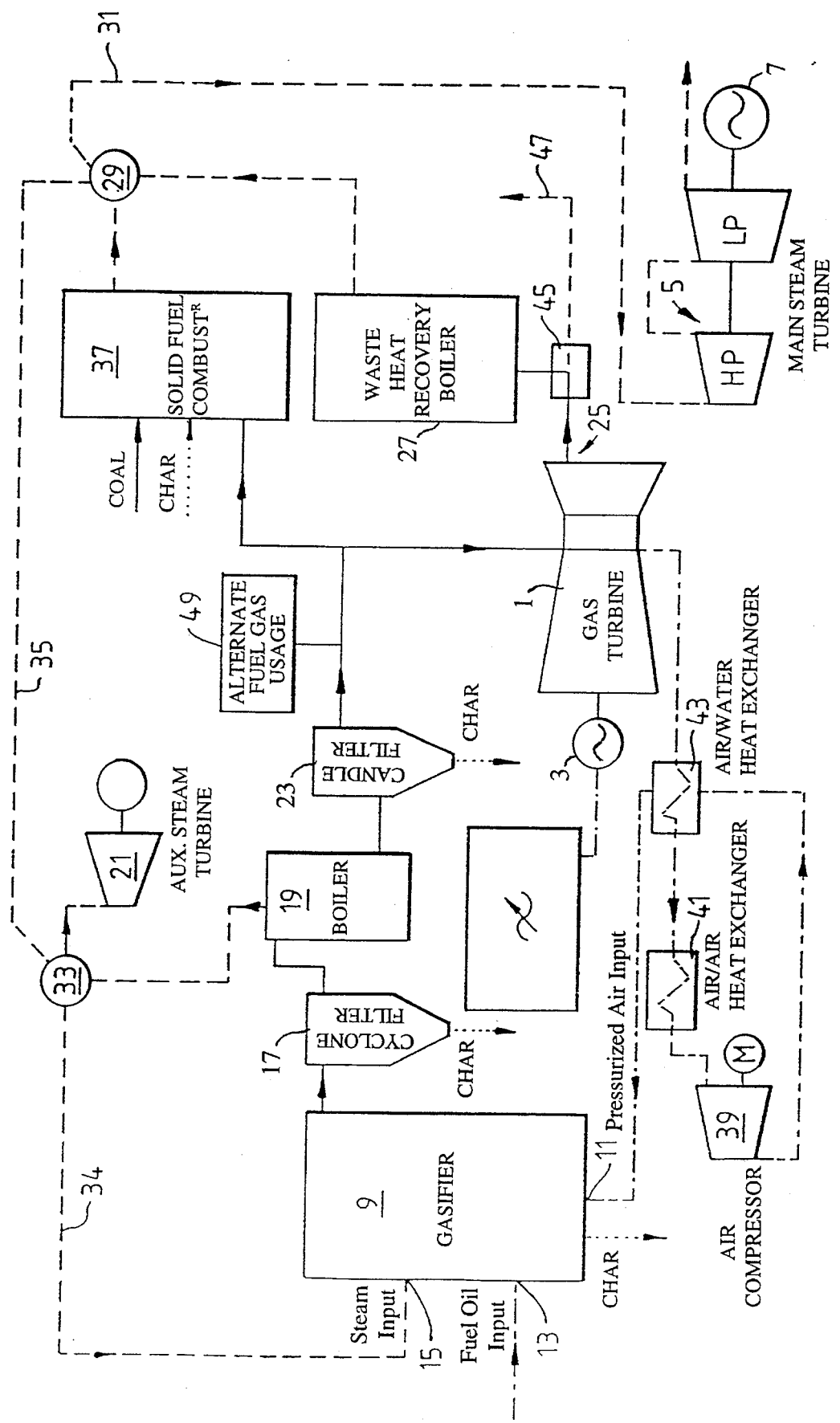

GAS-TURBINE AND STEAM-TURBINE BASED ELECTRIC POWER GENERATION SYSTEM WITH AN ADDITIONAL AUXILIARY STEAM TURBINE TO COMPENSATE LOAD FLUCTUATIONS

BACKGROUND OF THE INVENTION

This invention relates to an electric power generation system of the kind employing both gas and steam turbines and their associated electric generators. It is known to supply the gas turbine with gas from a gasifier of the fluidized bed type in which low grade solid fuel is granulated, heated with refractory particles and 'fluidized' by forcing air through the bed of material. The heating is controlled so that low grade fuel gas is produced which, after suitable cleaning and cooling, is supplied to the gas turbine where it is burnt with excess air and the combustion products used to power the turbine.

The gas turbine exhaust gases contain useful heat which can be extracted in a waste heat recovery boiler. Steam produced by this boiler is used to drive a steam turbine and its associated electric generator.

Further steam for the steam turbine can be produced by a circulating fluidized bed combustor which may be fed by char from the gasifier, supplementary coal, surplus gas produced by the gasifier, or any combination of these.

A problem arises in systems such as the above when sudden load variations occur on the electrical system fed by the turbogenerators. It is undesirable to run down the gas turbine in such circumstances since its efficiency suffers significantly with load variation. Load variations are therefore absorbed as far as possible by control of the steam turbine. The steam turbine can be run down rapidly but this results in surplus steam supply. A considerable portion of the available steam, say 30%, can, initially at least, be diverted to a steam condenser, bypassing the steam turbine in so doing. This is wasteful however, and further off-loading of the turbine cannot in any case be dealt with in this way. Reduction of steam generation can be achieved by diverting the gas turbine exhaust directly to atmosphere (via the 'blast stack') so bypassing the waste heat recovery boiler, or by reducing the gas supply to the circulating fluidized bed combustor. The former alternative is wasteful and the latter causes a gas surplus in the gasifier output.

It is difficult to turn the gasifier down to any significant extent without losing the ability to turn it up again rapidly. Turning down can be achieved by 'slumping the spouting bed', i.e. cutting off the air supply so that the bed is no longer fluidized. This effectively shuts down the gasifier with the result that resumption of electric power generation will take up to 6 hours. Such a situation is clearly to be avoided if at all possible.

SUMMARY OF THE INVENTION

It is an object of the present invention therefore to provide a power generation system using gas and steam turbines and gasification means in which the gasification means, of whatever kind, can be kept running at or approaching its rated output despite variations of considerable extent in the electrical loading of the steam turbine.

It is emphasized that the invention is not limited to any particular system of steam generation, such as that described above, nor to any particular gasifier, since advantages obtain with a system having only the following essential features.

According to the present invention, in an electric power generation system comprising a gas turbine and a main steam turbine adapted to drive respective electric generators, and gasification means for producing fuel-gas for driving the gas turbine and for supply to steam generating means for driving the main steam turbine, in which the gasification means is unable to follow variations of load on the main steam turbine as quickly as the main steam turbine itself, an auxiliary steam turbine and associated electric generator are provided and steam from the steam generating means is diverted from the main steam turbine to the auxiliary steam turbine to accommodate a reduction in load on the main steam turbine.

The steam generating means preferably includes a solid fuel combustor adapted to burn the fuel-gas additionally.

The steam generating means preferably includes first heat exchange means for recovering heat from the gas turbine exhaust gases, and second heat exchange means for extracting heat from raw fuel-gas output from the gasification means.

There are preferably included control means for controlling the relative supply of steam to the main steam turbine and to the auxiliary steam turbine and, independently for controlling a supply of steam to the gasification means particularly for starting up the gasification means.

At least some of the electric power for sustaining gasification means and auxiliary drives associated with it may be available from the electric generator driven by the auxiliary steam turbine.

There may be provided means for directing the fuel-gas output of the gasification means to an application independent of the gas turbine and the main steam turbine to permit independent operation of the gasification means.

The auxiliary steam turbine may have a power rating in the range 1/25th to 1/10th of the overall rating of the system.

BRIEF DESCRIPTION OF THE DRAWINGS

An electric power generation system in accordance with the invention will now be described, by way of example only, with reference to the accompanying drawing showing in block diagrammatic form a system employing gas and steam turbogenerator sets.

DETAILED DESCRIPTION OF THE PREFERRED EMBODIMENTS

Referring to the drawing, this shows a dual turbine system, a gas turbine 1 driving an electric generator 3 as a turbogenerator set, and a steam turbine 5 driving its generator 7 similarly. Typically, both turbogenerator sets are connected to feed an electricity supply system e.g. the grid system.

The gas turbine 1 is driven in known manner by combustion gases resulting from the combustion of fuel-gas, the latter being produced by gasification means comprising a fluidized bed 9 which heats and extracts fuel-gas from low grade solid fuel granules. Starting up the gasifier 9 is a major operation in view of the quantity of material involved and generally requires a fuel oil input 13 in addition to the normal pressurized air input 11 which fluidizes the bed. In normal operation steam is also input, as indicated at 15.

The residue of the gasifier bed, after de-gasification, is a char which is used elsewhere as will be explained.

Fuel-gas output from the gasifier 9 is first filtered in a cyclone filter 17, which produces more char, and then passed to a gas cooler 19 which acts as a main boiler to feed an auxiliary steam turbogenerator set 21. A steam turbine such as this is essential to the inventive aspect of this system. The steam turbine 21 in this example has a rating of 30 MW against the overall rating of the system of 450 MW. A suitable rating for this auxiliary steam turbine 21 is in the approximate range 1/25th to 1/10th of the overall rating, i.e. 18 MW to 45 MW.

The gas cooler/boiler 19 is followed by a 'candle filter' 23 comprising candle-like porous ceramic tubes and producing gas having negligible solid content. This cleaned gas is fed mainly to the gas turbine 1 for combustion, compression, and driving the turbine. The turbine exhaust gases, at 25, are at a fairly high temperature, and stored heat is extracted by a waste heat recovery boiler 27 to produce steam. This steam is fed to a controlled distribution unit 29 from which it may be supplied to the steam turbine 5 on path 31, or to a further distribution unit 33 on path 35, or to both in chosen proportion. The unit 33 can be controlled to feed steam from the gas-cooler/boiler 19 to the auxiliary steam turbine 21 or to the gasifier 9 on path 34 or, on path 35 to the unit 29 and the main steam turbine 5. In other circumstances, when it is required to off-load the main steam turbine 5, steam is fed from the unit 29 and from the cooler/boiler 19 to the unit 33 for joint supply to the auxiliary steam turbine 21. The units 29 and 33 have their exits and their entrances and one unit in its time plies many ports.

A solid fuel combustor in the form of a circulating fluidized bed combustor 37 is supplied with char from the gasifier 9, the cyclone filter 17 and the candle filter 23. It may also be supplemented by coal. The gasifier normally produces more fuel-gas than is required by the gas turbine, and the surplus is fed to the combustor 37 to supplement the solid fuel input.

The unit 29 receives steam from the boiler 27, the combustor 37, and in some circumstances from the cooler/boiler 19 on path 35, and supplies it to the main steam turbine 5.

Compressed air for the gasifier 9 is provided by a boost air compressor 39 which receives air bled from the gas turbine (1) compressor by way of an air/air heat exchanger 43 and an air/water cooler 41.

In the basic topping cycle as proposed hitherto, the low calorific value gas produced by the gasification process 9 is burnt in the gas turbine 1 as fuel. The exhaust gas from the turbine is passed through a divertor 45 routing it normally to the boiler 27 or to the blast stack 47 (bypass) during start-up and certain fault conditions.

In addition to the two boilers 27 and 37, heat is extracted from the raw fuel-gas in the steam boiler 19 and low grade heat is extracted from additional coolers (not shown) in the gasifier char 'letdown' and the booster compressor 19 delivery lines.

All the heat produced at various points in the thermodynamic cycle is collected together and the resultant steam passed through the main (and only) steam turbine 5.

If for any reason the steam turbine loses load, the heat is dissipated by allowing up to 30% of the normal steam flow to flow direct to the condenser.

The heat input has now to be reduced to match the output.

In order to do this the gas turbine heat recovery system generator (HRSG) 27 has to be reduced in output. The gas turbine can be off-loaded quickly and the exhaust may be diverted to the blast stack 47 using the divertor 45. The circulating fluidized bed combustor (CFBC) 37 and gasifier 9 have to be turned down in order to match the 30% water flow (i.e. condensed bypass steam).

The timescale for this is very short and can only be met by 'slumping the spouting bed' of the CFBC as mentioned previously.

Thus loss of steam turbine load leads to shutdown of the gasifier: resumption of station electric power generation will then take up to 6 hours.

The embodiment described above breaks this loop of dependency on the main steam turbine. It achieves this by the addition of the small, auxiliary, steam turbine 21 which will utilize all the heat generated in the gasification part of the process.

Heat from the boost compressor cooler 43 and the char cooler (not shown) totalling about 18 (MTW) is used as low temperature feed heating.

The raw gas cooler 19 is used as the main boiler and the output is high pressure up to 160 Bar (2300 psi) superheated steam, as in the similar "syn-gas" boilers in the process industry.

For a topping cycle plant of 450 MW, the proposed auxiliary steam turbine 21 would be about 30 MW and require steam inlet pressure of about 40 bar (580 psig) and 400° C. (750° F.) for optimal thermal efficiency.

The high pressure steam is de-tempered and reduced in pressure as necessary to match the auxiliary steam turbine requirements.

The auxiliary steam turbine system includes full feed heating, gland steam condensers, condensate pump and boiler feed pump and is capable of full operation independent of the main steam turbine.

The advantages of this are as follows:
1. The auxiliary steam turbine provides all the electrical power for sustaining the gasification system and all other gasification system auxiliary drives.
2. The gasification system can be run independent of the gas turbine 1 or the main steam turbine 5 providing the gas produced can be used elsewhere (e.g. as shown at 49).
3. The gas turbine 1 can be operated separately.
4. The main steam turbine 5 can be operated over a wide load range without altering the gas fuel flow to the gas turbine.
5. When the station is operating at a high load factor any sudden load changes can be done on the much faster response 30 MW steam turbine. The load then can be re-adjusted on the main gas (1) and steam turbine (5) at a slower rate. This is an improvement as it reduces the effect of thermal cycling on the main gas turbine.
6. Steam can be extracted from the cooler/boiler 19 and used in the gasifier 9. (It should be noted that, in the known system this gasifier steam is extracted from the input to the main steam HP turbine. Reduction of steam turbine load reduces the steam pressure requirement and at lower loads this requirement becomes lower than the gasifier pressure. So the main steam turbine cannot then be used as the sole source of steam for the gasifier).
7. The steam supply to the auxiliary turbine 21 can be used for warming the main steam turbine and maintaining gland sealing.
8. Under high load conditions steam can be transferred from the cooler/boiler 19 to the main steam turbine 5 along path 35 or vice versa for optimum cycle efficiency.

9. Under abnormal low frequency conditions on the electricity supply network that normally determines the speed of auxiliary drives in the system, (as in the year of 1963 on the national grid) the independent output generated by the steam turbine 21 enables all the auxiliary drives to operate at full speed instead of grid frequency. Boiler feed pumps are electric motor driven, and cannot sustain full pressure at such reduced speed.

10. For 'black start' conditions the starting of the gasifier on oil can produce steam in the cooler 19 which is then supplied on path 34 and used to start the full gasification. As more heat is produced the steam turbine 21 can be used to provide some electrical power until there is sufficient to start the main gas turbine.

11. In the event of grid failure and consequent loss of load, the auxiliary drives are still kept going and the gasification system maintained at operational temperature so that full load can be resumed quickly once demand is re-established.

12. Fitting the auxiliary steam turbine as part of the gasifier system fundamentally improves the versatility of the gas steam combined cycle and its safety and operational integrity.

I claim:

1. An electric power generation system, comprising: a gas turbine and a main steam turbine for driving respective electric generators; gasification means for producing fuel-gas for driving said gas turbine and for supply to steam generating means for driving said main steam turbine, said gasification means being unable to follow variations of load on said main steam turbine as quickly as said main steam turbine itself; an auxiliary steam turbine and associated electric generator; and means for diverting steam produced by said steam generating means from said main steam turbine to said auxiliary steam turbine to accommodate a reduction in load on said main steam turbine without requiring a corresponding reduction in operation of said gasification means.

2. An electric power generation system according to claim 1 wherein said steam generating means includes a solid fuel combustor for burning said fuel-gas additionally.

3. An electric power generation system according to claim 1, wherein said steam generating means includes first heat exchange means for recovering heat from exhaust gases of said gas turbine.

4. An electric power generation system according to claim 1, wherein said steam generating means includes second heat exchange means for extracting heat from fuel-gas output from said gasification means.

5. An electric power generation system according to claim 4, wherein said diverting means includes control means for controlling the relative supply of steam to said main steam turbine and to said auxiliary steam turbine.

6. An electric power generation system according to claim 5, wherein said control means is adapted to control a supply of steam to said gasification means.

7. An electric power generation system according to claim 6, wherein said control means is adapted to control a supply of steam from said second heat exchange means to said gasification means for starting up said gasification means.

8. An electric power generation system according to claim 1, wherein at least some of the electric power for sustaining said gasification means and auxiliary drives associated with it is available from said associated electric generator driven by said auxiliary steam turbine.

9. An electric power generation system according to claim 1, including means for directing the fuel-gas output of said gasification means to an application independent of said gas turbine and said main steam turbine to permit independent operation of said gasification means.

10. An electric power generation system according to claim 1, wherein said auxiliary steam turbine has a power rating in the range 1/25th to 1/10th of the overall rating of the system.

11. An electric power generation system according to claim 4, wherein means are provided for feeding steam from said second heat exchanger for warming said main steam turbine on start-up and/or for maintaining gland sealing in said main steam turbine.

\* \* \* \* \*